United States Patent [19]

Fisher

[11] Patent Number: 4,846,422
[45] Date of Patent: Jul. 11, 1989

[54] SINGLE PIECE EVACUATION SYSTEM FOR AIRCRAFT OR THE LIKE

[75] Inventor: John M. Fisher, Cuyahoga Falls, Ohio

[73] Assignee: The BFGoodrich Company, Akron, Ohio

[21] Appl. No.: 609,618

[22] Filed: May 14, 1984

[51] Int. Cl.[4] .............................................. B64D 25/00
[52] U.S. Cl. ................................... 244/137.2; 182/48; 244/905; 193/25 B
[58] Field of Search ..................... 244/137 P, DIG. 2; 182/48; 193/25 B

[56] References Cited

U.S. PATENT DOCUMENTS

| | | | |
|---|---|---|---|
| 3,866,734 | 2/1975 | Elkins et al. | 244/DIG. 2 |
| 3,973,645 | 8/1976 | Dix et al. | 244/DIG. 2 |
| 4,333,546 | 6/1982 | Fisher | 182/48 |
| 4,434,870 | 3/1984 | Fisher | 182/48 |

FOREIGN PATENT DOCUMENTS 1316815  5/1973  United Kingdom ......... 244/DIG. 2

Primary Examiner—Galen Barefoot
Attorney, Agent, or Firm—Joseph Januszkiewicz

[57] ABSTRACT

An improved inflatable over-the-wing evacuation slide. The slide is provided with an inflatable wing ramp section projecting from the foot of the wing exit door to a point on the aircraft wing remote from the door. The wing ramp section also includes a generally flat upper or walkway surface and a lower face surface projecting in a tapered contact with the sloping aircraft wing. It also includes a pair of inflatable guard rails attached to the side margins of the inflatable wing ramp. The wing ramp then includes a right angle turn remote from the exit door and continues to terminate in an extended section proceeding from the wing to the ground. A unique support system is provided on the underside of the central portion of the extended ramp consisting of inflatable portions shaped to provide support to the slide regardless of the position of the trailing edges of the wing flaps. A continuous inflated floor configuration is thus provided which presents a smooth uninterrupting walking surface to the steeper slide section of the unit. The walking surface eliminates the joint between the two distinct inflatables sections, on the wing and beyond, which can, at times, present a tripping point for the people evacuating the aircraft when using the inflatable device.

7 Claims, 5 Drawing Sheets

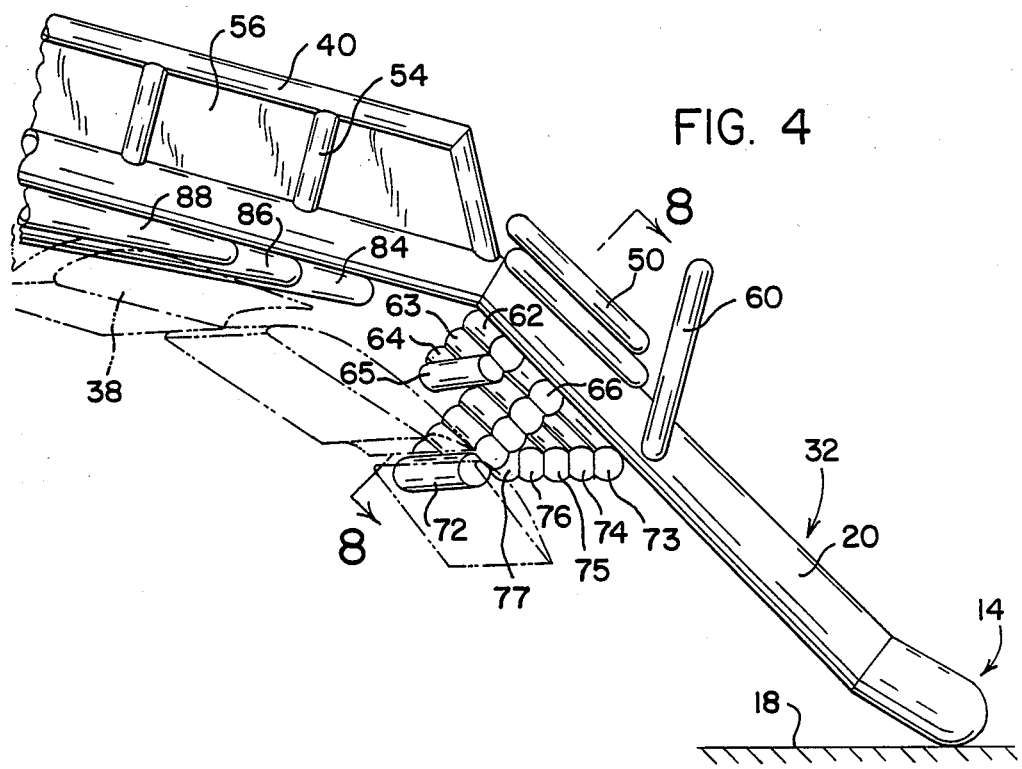
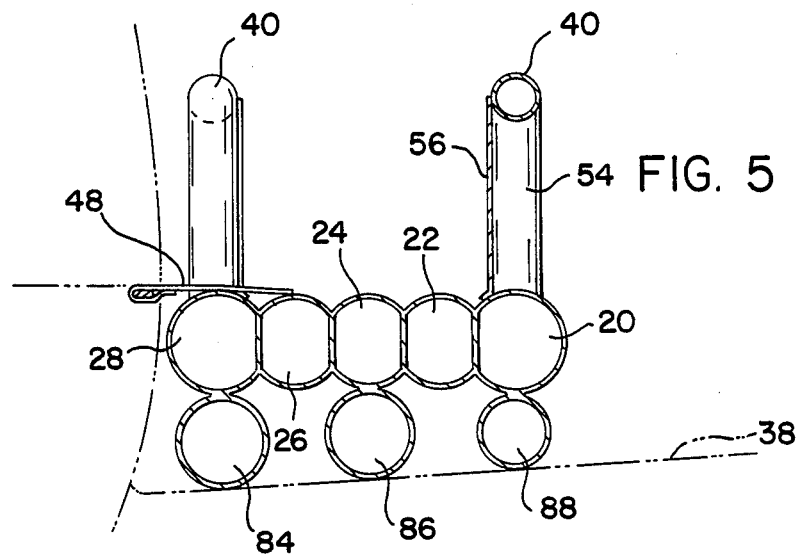

FIG. 6
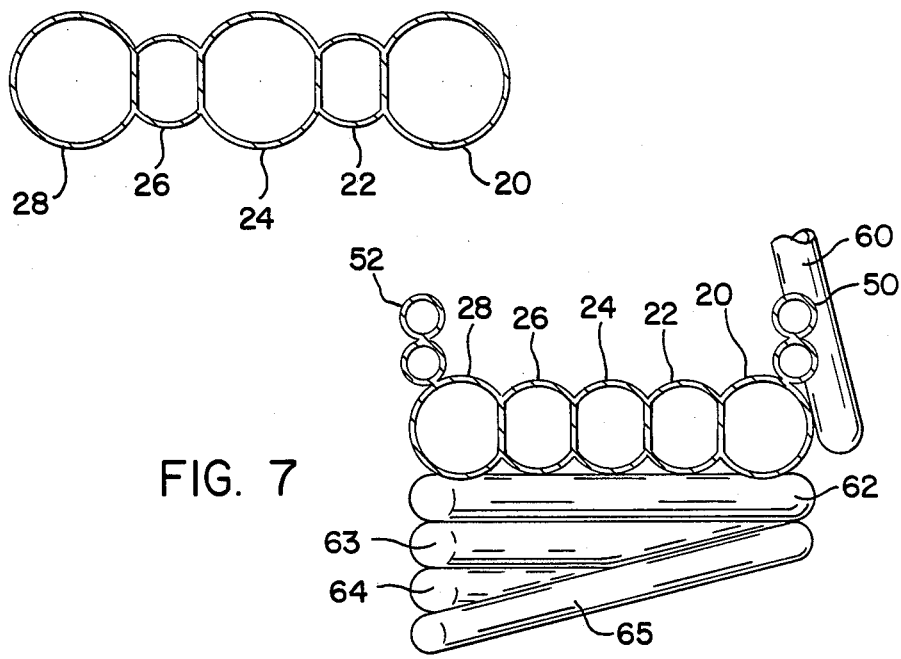
FIG. 7
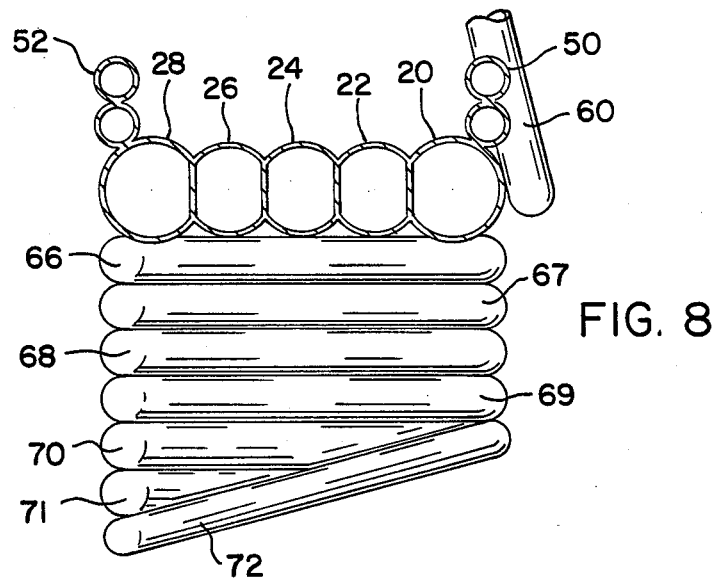
FIG. 8

SINGLE PIECE EVACUATION SYSTEM FOR AIRCRAFT OR THE LIKE

BACKGROUND OF THE INVENTION

This invention relates to emergency evacuation equipment having particular applicability to aircraft. More particularly, this invention relates to an inflatable slide for emergency exits immediately over the wing of the aircraft.

The requirements for reliably evacuating airline passengers in the event of an emergency becomes more important as the size of the aircraft and the number of passengers increases. Emergencies on take-off and landing often demand swift removal of the passengers from the aircraft because of potential injuries from fire, explosion or sinking in water.

One obvious method of more quickly evacuating a large number of passengers, possibly five hundred or more, from a single new large aircraft is to provide more individual emergency exits. Preferably these exits should be positioned as close to the passenger seating as possible.

A substantial number of passengers' seats are normally located directly over the wing section of the low wing aircraft. Therefore, it is extremely desirable to locate emergency exit doors immediately over the aircraft wing so that the passengers can exit the aircraft by stepping out onto the wing and onto an inflated evacuation slide.

For military aircraft, and especially for large troop carrying aircraft, it may also be desirable to provide auxiliary wing exits on the aircraft to facilitate the unloading of a large number of troops as well as a large quantity of cargo in a short as time as possible, particularly at a time of crisis.

While it is obviously desirable to provide wing exits for large commercial and military aircraft, the passenger deck level of a low winged aircraft is often considerable higher than the upper surface of the wings. Emergency exits doors over the wing sections must therefore be located several feet above the wing. These design parameters complicate the design of suitable escape slides. Furthermore, the design of aircraft wings provides the upper wing surface with a substantial pitch. Consequently, to evacuate passengers from a wing exit the passengers must drop several feet from the exit opening onto a sloping surface. It is readily apparent that in an emergency, a substantial number of injuries may be encountered at such an exit during the hurried departure of the passengers if an escape slide being used were not of a sophisticated design.

In order to minimize the possibility of injuries at the emergency wing exits, it is desirable to provide some type of auxiliary evacuation equipment for use at wing exits that would compensate for the substantial drop from the exit door to the wing and the slope of the upper surface of the wing section. Further, in such situations, it is desirable to employ a slide of a design and construction which has a right angle turn for the passengers after leaving the aircraft before proceeding down the elongated portion of the slide to the ground. As can be understood, in such situations supplemental supports must be provided under the extended segment of the slide at the section where the slide bends downwardly over the aircraft wing since the slide at this juncture is no longer supported by the upper surface of aircraft wing itself.

In designing such emergency escape slide equipment, it is an absolute requirement that the equipment incorporate light weight features that would not add substantially to the weight of the aircraft. In addition, the equipment must be compact when not in use and capable of storage in minimum storage space.

As a result of the emergency nature of any aircraft evacuation system it is a further absolute requirement of any system that it be capable of reliable deployment and available for use in as short a time as possible.

Another feature desired in any evacuation slide equipment is that the equipment both in fact and in appearance provide the passengers with a sturdy and stable means for departing from the aircraft. This will assure the safety of the passengers. In addition, it will also provide the passengers with confidence in using the evacuation slide equipment.

SUMMARY OF THE INVENTION

The present invention relates to an improved inflatable over-the-wing evacuation slide. The slide is provided with an inflatable wing ramp section projecting from the foot of the wing exit door to a point on the aircraft wing remote from the door. The wing ramp section also includes a generally flat upper or walkway surface and a lower face surface projecting in a tapered contact with the sloping aircraft wing. It also includes a pair of inflatable guard rails attached to the side margins of the inflatable wing ramp. The wing ramp then includes a right angle turn remote from the exit door and continues to terminate in an extended section proceeding from the wing to the ground. A unique support system is provided on the underside of the central portion of the extended ramp consisting of inflatable portions shaped to provide support to the slide regardless of the position of the trailing edges of the wing flaps. This support feature is especially critical when the flaps are in the landing position, approximately 25-35 degrees downwardly from the horizontal. This design and construction helps to prevent the walking ramp area from collapsing into a steep angle of wing flaps that might otherwise cause the personnel being evacuated to lose their footing. A continuous inflated floor configuration is thus provided which presents a smooth uninterrupting walking surface to the steeper slide section of the unit. The walking surface eliminates the joint between the two distinct inflatables sections, on the wing and beyond, which can, at times, present a tripping point for the people evacuating the aircraft when using the inflatable device.

The inflatable wing evacuation assembly of the present invention provides a light weight structure that can be compactly stored on an aircraft and quickly assembled at a wing door exit in the event of an emergency. When inflated, the device provides a stable structure over which the passengers can safely and confidently depart the aircraft during an emergency situation.

According to the invention the foregoing features are attained through an improved inflatable escape slide formed of inflatable tubular members in such fashion as to provide a safe and reliable escape slide.

BRIEF DESCRIPTION OF THE DRAWINGS

The appended drawings illustrate the preferred embodiment of the present invention made in accordance with the concepts of the present invention.

In the drawings:

FIG. 4 is an enlarged orthographic view of the slide and wing and ground similar to that shown in FIG. 1 but more clearly illustrating the supports adjacent the central area of the escape slide.

FIG. 5 is a sectional view of the escape slide taken along line 5—5 of FIG. 1 showing the upper portion of the evacuation slide, the girt and the aircraft body.

FIG. 6 is a sectional view of the escape slide taken along line 6—6 of FIG. 1 near the bottom of the escape slide.

FIG. 7 is a sectional view of the escape slide taken along line 7—7 of FIG. 1 near the mid point of the escape slide.

FIG. 8 is a sectional view of the escape slide taken along lines 8—8 of FIG. 4 showing the tubular arrangement of the slide at a central portion thereof slightly downstream from the FIG. 7 sectional view.

DETAILED DESCRIPTION OF THE INVENTION

Figure 1:
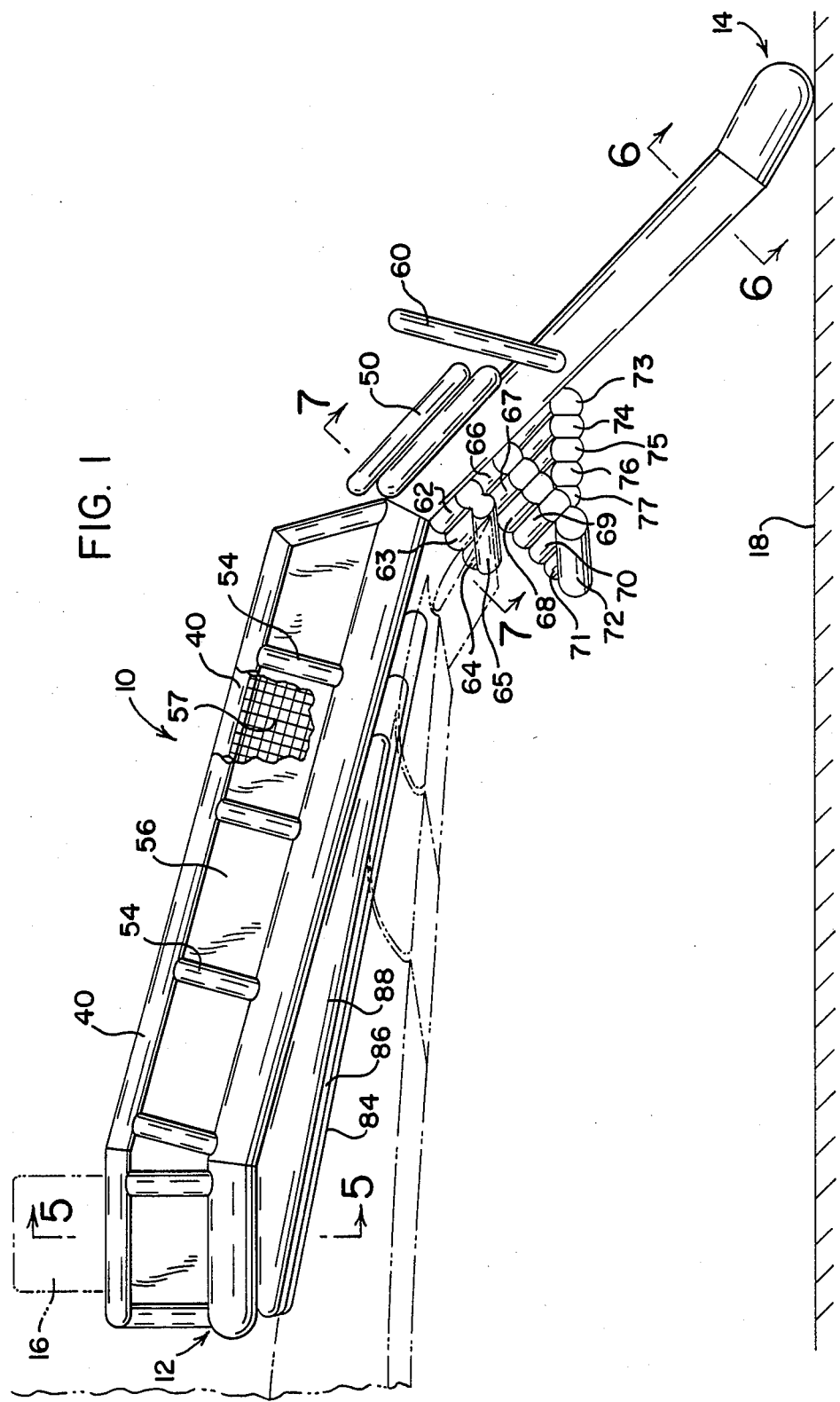
FIG. 1 is a side elevational view of the escape slide constructed in accordance with the instant invention also illustrating the wing door exit, the wing and the ground.

Referring now to the drawings, like reference characters designate like or corresponding parts throughout the several views. There is shown in the various FIGS. an inflatable evacuation slide device constructed in accordance with the principal of the instant invention. The slide device is generally designated by numeral 10. It includes a head end 12 and a foot end 14, adapted to couple an over-the-wing exit door 16 of an aircraft with the ground 18.

The entire device is preferably fabricated from an air impervious material, preferably an elastomer such as urethane or other suitable elastomer which is preferably coated on a light weight fabric. The various parts may be joined together with a suitable adhesive whereby the structure will form a unitary composite structure which will preclude airflow from the chamber during inflation and operation in the inflated state including operation in and around water.

The entire structure of the inflatable is preferably formed into a single internally pneumatic slide assembly adapted to receive an airform fluid from a compressed pressurized source utilized for its deployment. The assembly is preferably made up of various segments of such materials, on tubular fashion, and configured to achieve the desired operational results. The main body portion of the slide is constructed of a predetermined number, five in the preferred embodiment pneumatic tubular sections or main tubes 20, 22, 24, 26 and 28, pneumatically interconnected internally thereof. The central three tubular sections 22, 24 and 26 constitute the main slide portion of the assembly which includes an upper zone 30 positionable adjacent the aircraft door and supported by the aircraft wing. The assembly also includes a lower section 32 unsupported by an aircraft wing for joining the slide to the ground. Intermediate thereof there is provided a central section 34 located adjacent the flap of the aircraft wing 38. The inboard and outboard peripheral tubes 20 and 28 support the hand rails 40. They also extend continuously around the upper and lower ends of the three central tubular sections and constitutes the upper and lower end chambers.

Side supports in the form of handrails are provided on the peripheral tubes at all locations except where passengers enter or leave the slide, that is at the aircraft door and the ground. A ditching door 44 is located in the hand rails in a position adjacent the upper end of the slide on the aircraft wing near the exit door. The railing functions to preclude passengers from moving out of the door and proceeding toward the tip of the wing of the aircraft or toward any other usable location. Such handrail members in association with the ditching door will effectively direct passengers toward the intermediate and then the lowermost segments of the slide in the desired direction of movement.

The ditching door is provided separate from the remainder of the sides as an alternate escape route in the event of certain conditions wherein passengers may wish to be directed away from the slide. Such situations occur when, for example, the aircraft is downed in the sea and the sea level is approaching the wing and access to a raft is in a direction opposite the lower end of the slide.

Further, a girt 48 is utilized as part of the walkway coupling the lower surface of the aircraft door to the upper surface of the slide during normal operations. This girt securely couples the slide to the aircraft under all conditions.

The handrail continues to direct the passengers properly as it extends from the door of the aircraft. The handrail then continues to point at the outboard end of the intermediate section of the slide. Separate and lower guiderails 50 and 52 then extend from the inboard end of the lower segment of the slide terminating at a location above the foot end of the slide.

Support struts 54 pneumatically and periodically couple the peripheral tubes with the handrails. Sheets 56 of light weight material close off the spaces between the struts, handrail and tubes to preclude inadvertent movement of the passengers in other than the predesired route down the slide. A similar piece of sheeting material 58 is provided at the intermediate segment of the ditching door.

As shown in FIG. 1, the panels on the side of the slide adjacent the aircraft are preferably formed of an open mesh material 57. This permits the illumination of the upper surface of the slide when used by passengers at night. Light from the aircraft is employed to illuminate the slide by virtue of the open mesh material.

The end of the intermediate section terminates in the sloping, lower section which is unsupported by the aircraft wing. At the upper end of the lower section are directing rails, lower than the handrails to provide initial direction of evacuating passengers toward the terminal end of the slide. Also, an indicator tube 60 is pneumatically coupled with the slide to project upwardly at an appropriate angle inwardly toward the center of the slide whereby a passenger or a member of the aircraft crew can observe that the slide is fully deployed and ready for utilization by virtue of observing the indicator tube from the exit door.

Located on the underside of the central tubes at the upper and intermediate sections of the slide are a series of support tubes 62 through 80, three sets shown in the preferred embodiment, pneumatically coupled with the peripheral and centermost tubes. The support tubes include an upper set designated as 62, 63, 64 and 65, an intermediate set designated by numerals 66, 67, 68, 69, 70, 71 and 72 and a lower set designated by numerals 73, 74, 75, 76, and 77. The support tubes are angled and constructed to be resident upon the extension of the aircraft wing in the downed condition to provide firm horizontal support for the upper surface of the slide and then a gradual slope for passengers exiting. The particular orientation of three angled sets of tubes at this location permits the full support of the slide at this upper section regardless of the extension of the aircraft wing or its upward or downward orientation.

FIGS. 1, 4, 7 and 8 show in detail additional support struts extending laterally across the main tubes at the upper end of the lower section of the slide. Three sets of struts are preferably utilized with the central set extending downwardly from the under surface of the main tubes then the upper and lower sets. These struts add rigidity to the slide where the slide begins an extent unsupported by the wing of the aircraft. The lowermost surfaces of the struts are variously sized, angled and configured to receive support from the aircraft flap, regardless of its extention and angle.

As can be seen in FIG. 1, additional support tubes 84, 86 and 88 extend in the direction of the five main tubes of decreasing diameters in a direction away from the upper section. These support tubes position the upper surface of the slide horizontally. But, thereafter, where passengers make a right angle turn away from the door to the intermediate section, the support tubes permit the slide to begin to angle downwardly toward the foot end of the slide.

Figure 2:
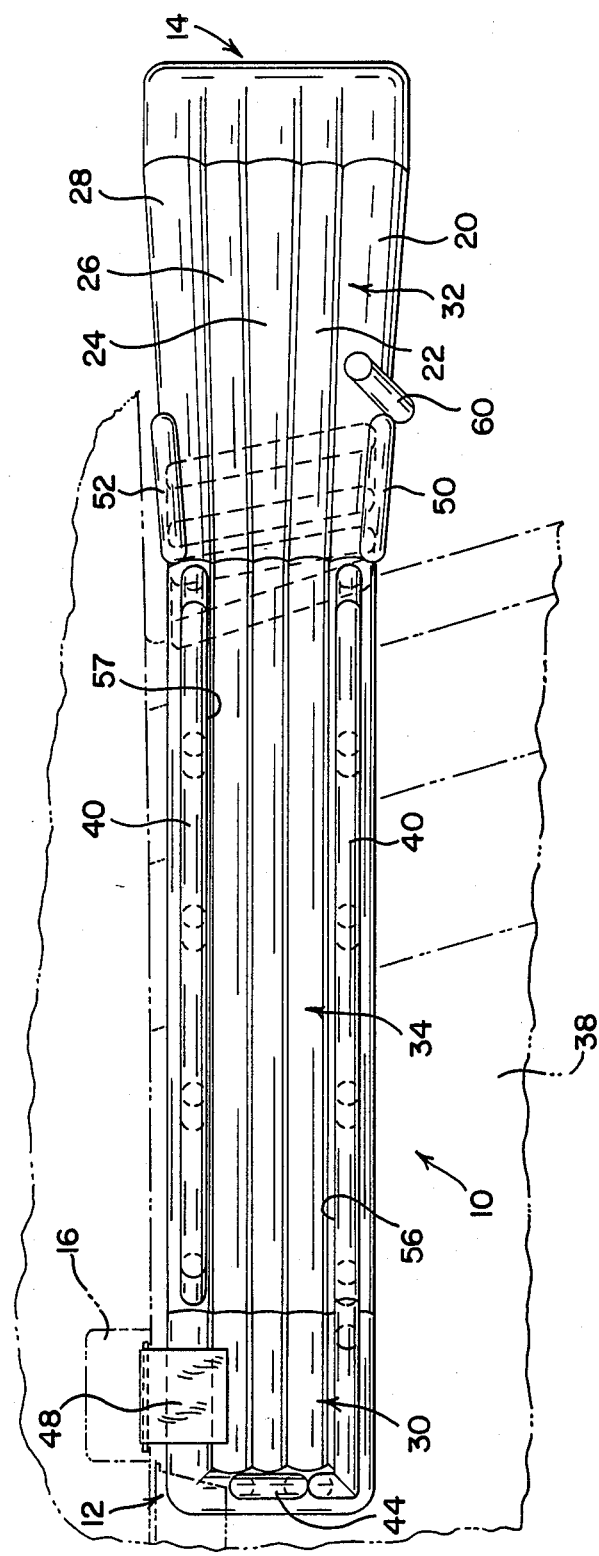
FIG. 2 is a planned view of the top surface of the escape slide as shown in FIG. 1, again showing the slide in the fully deployed orientation.
Figure 3:
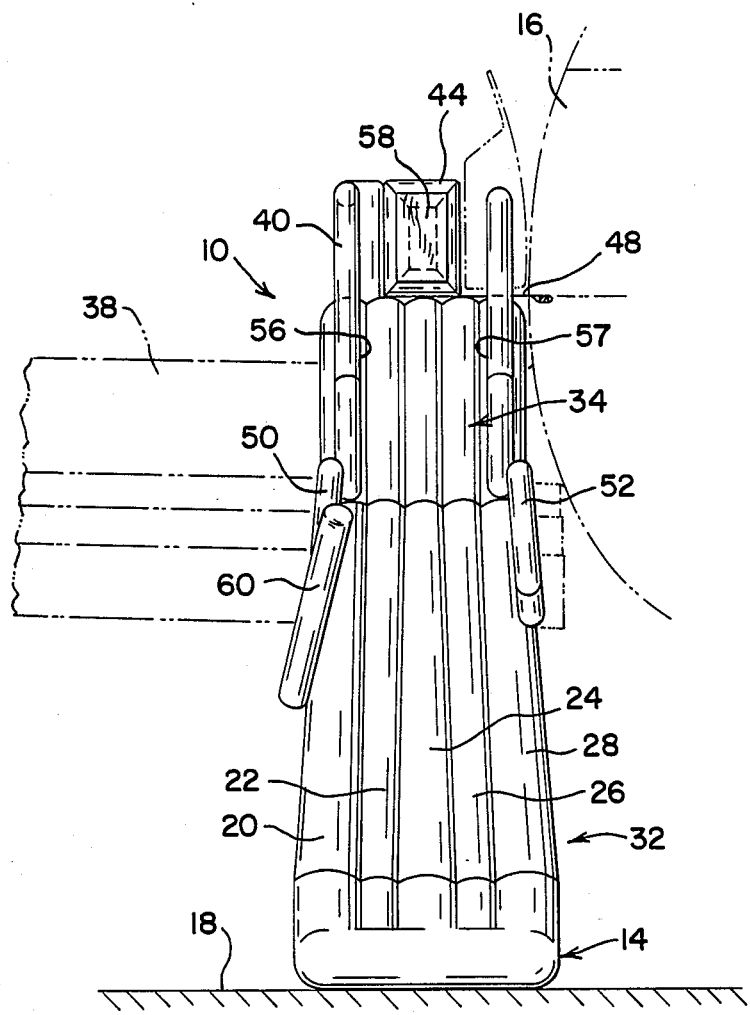
FIG. 3 is an end view shown from the ground looking upwardly of the escape slide in the fully deployed orientation as illustrated in FIGS. 1 and 2.

Lastly, as can be seen more specifically in FIG. 2, the lowermost section of the slide flares outwardly to preclude the sideways motion of evacuating passengers off the slide in other than the preferred movement to the end. Furthermore, the expanded end precludes the inadvertent bumping and inconveniencing of passengers as they evacuate the aircraft through the use of the slide.

The peripheral tubes of the slide become enlarged as they approach the ground. Note FIG. 2. This enlargment on the slide will cause the slide to effectively become troughed as passengers are utilizing it when approaching the ground. This is a further safety factor to preclude passengers from falling off the side of the slide during evacuation from the aircraft.

While the present invention has been described as being carried out in a preferred embodiment thereof, it is not intended to be so limited but is intended to be covered broadly within the spirit and scope of the appended claims.

What is claimed is:

1. An inflatable slide device for emergency evacuation including main tubes defining a slide surface extending from a head end of the slide to a foot end of the slide, the upper portion of said tubes extendable horizontally from an exit door to a remote point, the intermediate section of said tubes extending at a right angle from said upper portion and angling downwardly toward the ground and the lower section of said tubes extending to the ground, said main tubes extend integrally as a unit from said head end to said ground, said slide also including a plurality of supports beneath said tubes at the upper section and intermediate section for being supported by an aircraft wing and a plurality of additional supports beneath said tubes at the upper part of the lower section for providing additional rigidity to said tubes through the lower section.

2. The slide as set forth in claim 1 wherein said first mentioned supports extend parallel with said tubes.

3. The slide as set forth in claim 1 wherein said additional supports extend transversely across said tubes.

4. The slide as set forth in claim 1 and further including a girt permanently coupling the horizontal upper section of the slide with the lower surface of the exit door.

5. The slide as set forth in claim 1 and further including inflatable hand rails extending upwardly from the peripheral main tubes throughout the upper and intermediate sections except adjacent the exit door.

6. The slide as set forth in claim 5 wherein the handrail includes a ditching door, separate from the remainder of the handrail, adjacent the exit door but in a direction opposite the intermediate section.

7. An inflatable slide device for emergency evacuation including main tubes defining a slide surface extending from a head end of the slide to a foot end of the slide, the upper portion of said tubes extendable horizontally from an exit door to a remote point, the intermediate section of said tubes extending at a right angle from said upper portion and angling downwardly toward the ground and the lower section of said tubes extending to the ground, said slide also including a plurality of supports parallel with said tubes beneath said tubes at the upper section and intermediate section for being supported by an aircraft wing and a plurality of additional supports extending transversely across said tubes beneath said tubes at the upper part of the lower section for providing additional rigidity to said tubes through the lower section.

* * * * *